(No Model.)

J. H. PARKINSON.
POROUS PERMANGANATE BLOCK AND PROCESS OF MAKING SAME.

No. 515,443. Patented Feb. 27, 1894.

WITNESSES

INVENTOR

UNITED STATES PATENT OFFICE.

JAMES HOWARTH PARKINSON, OF MANCHESTER, ENGLAND.

POROUS PERMANGANATE BLOCK AND PROCESS OF MAKING SAME.

SPECIFICATION forming part of Letters Patent No. 515,443, dated February 27, 1894.

Application filed June 16, 1891. Serial No. 396,431. (Specimens.)

*To all whom it may concern:*

Be it known that I, JAMES HOWARTH PARKINSON, a subject of the Queen of England, residing at Manchester, in the county of Lancaster, England, have invented certain new and useful Improvements in Treating Permanganate to Produce a Porous Spongy Mass, of which the following is a specification.

The object of the invention is to transform an alkaline permanganate or manganate (such as the permanganate or manganate of potash or permanganate or manganate of soda) into a porous or spongy mass through which air can easily pass and come in contact with a large surface of the said material. It is to be used in the separation of oxygen from atmospheric air by passing the air through the material while heated to a high temperature in retorts or furnaces as described in the specification filed by me with an application for Letters Patent of even date herewith.

It consists essentially in mixing the alkaline manganate or permanganate with kaolin and water into a pasty mass and then baking in a retort or oven until dry, hard, and porous.

The invention will be fully described with reference to the annexed drawings in which as an example a form of oven or stove is shown in which the mass of permanganate may be dried.

Figure 1:
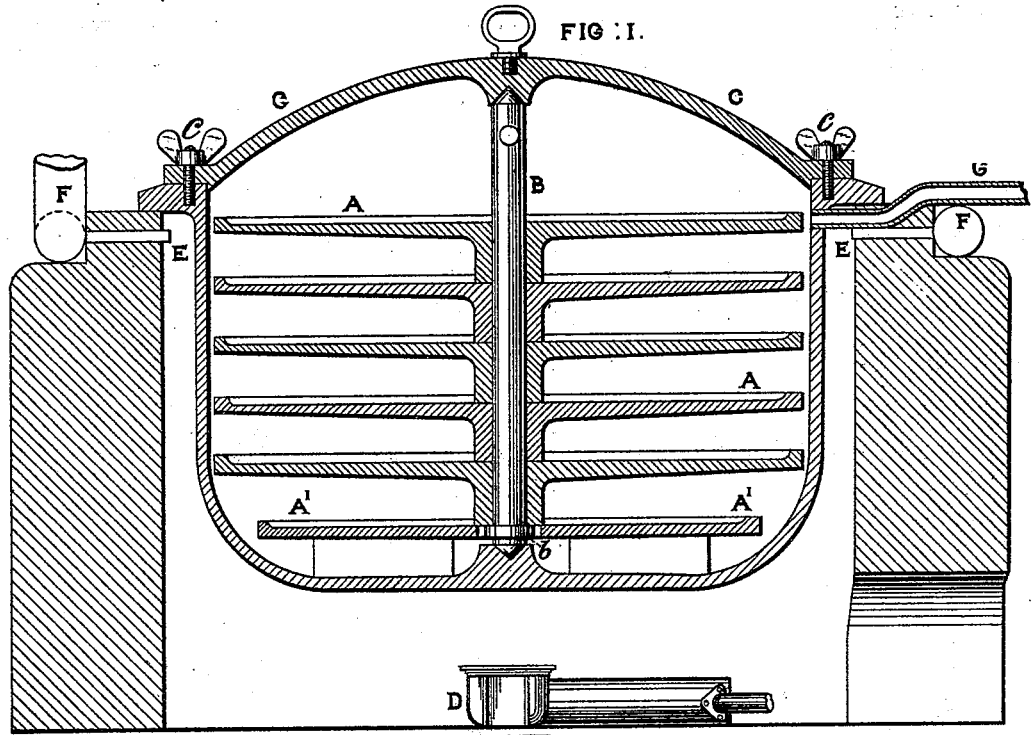
Figure 2:
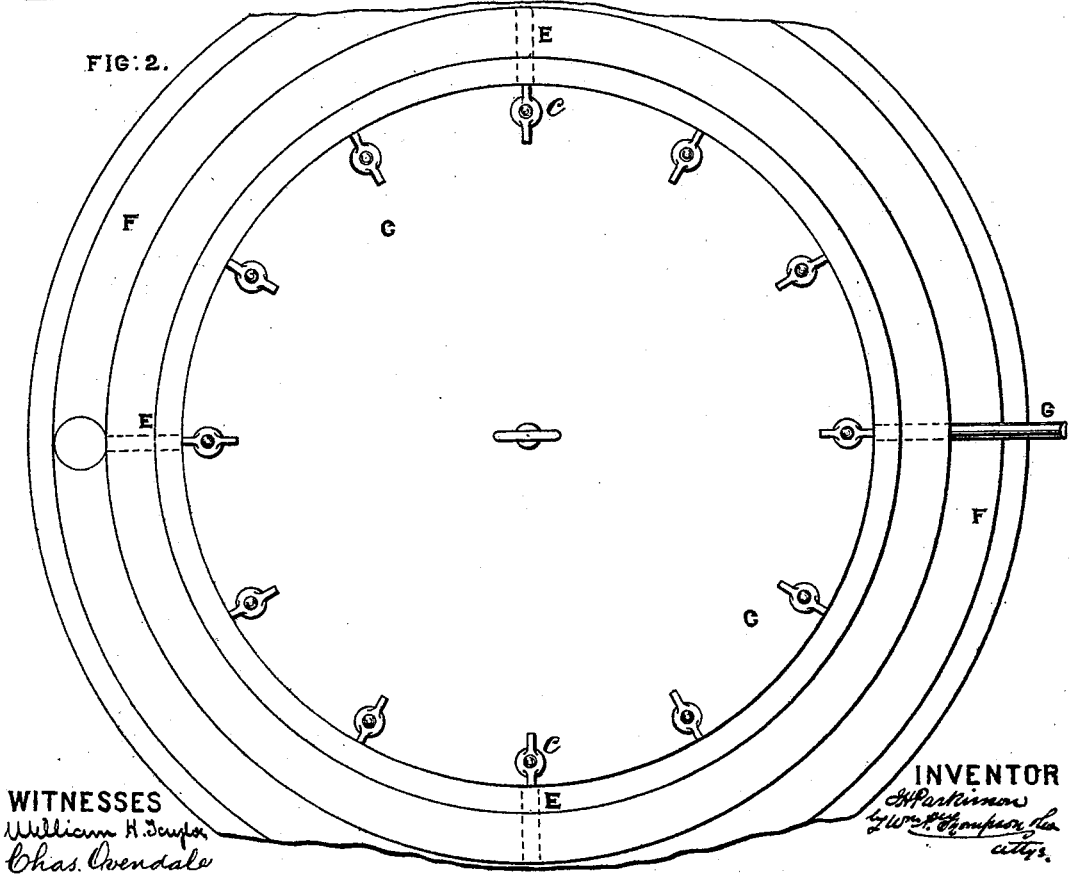

Figure 1, is a sectional elevation; Fig. 2, a plan.

The oven or stove is formed with a number of shelves A upon which the material may be placed in molds or otherwise. The shelves are supported on a spindle B by the collar *b* are removable and may be lifted out singly or the spindle and shelves may be lifted out together. The cover C is secured by bolts *c* and an additional shelf A' is placed below the shelves A.

The oven or stove is heated by a gas burner D the products of combustion passing off through the pipes E to the flue F. The interior of the oven or stove is connected by a pipe G with an air or vacuum pump by which a partial vacuum may be formed and the moisture drawn off at as low a temperature as possible.

I take the alkaline permanganate and thoroughly mix or grind it together with a small percentage of pure kaolin. The amount of kaolin should be just sufficient to bind the mass together when dried say about from ten to twelve and one-half per cent. and the two are mixed together with water into a stiff paste. The pasty mass is then molded into brick slabs or other forms which can be easily handled and placed in a temperature beginning at about 15° to 20° centigrade and gradually increasing to about 100° centigrade for about four hours until dry and hard. During the operation of drying the pressure in the retort is reduced below the atmospheric pressure by means of an air pump connected by the pipe G whereby the moisture becomes vaporized assisted by the heat and is drawn off leaving a spongy porous mass readily permeated throughout by air. The heating of the permanganate may drive off some of the oxygen as it approaches its maximum temperature thus forming a still more porous and lower oxide thereof which is capable again of taking up or absorbing oxygen.

What I claim as my invention, and desire to secure by Letters Patent, is—

1. The process of forming a spongy or porous mass from permanganate of potash or soda which consists in mixing the permanganate into a pasty mass with kaolin and water and baking hard and dry in an oven or stove in a partial vacuum substantially as described.

2. A spongy porous mass consisting of permanganate of soda or potash in combination with kaolin as described.

In testimony whereof I have signed my name to this specification in the presence of two subscribing witnesses.

JAMES HOWARTH PARKINSON.

Witnesses:
   J. OWDEN O'BRIEN,
   CHAS. OVENDALE.